(12) United States Patent
Morgan

(10) Patent No.: US 6,170,787 B1
(45) Date of Patent: Jan. 9, 2001

(54) EXPANDABLE CUP HOLDER FOR A VEHICLE

(75) Inventor: Paul E. Morgan, Appling, GA (US)

(73) Assignee: Club Car, Inc., Augusta, GA (US)

(*) Notice: Under 35 U.S.C. 154(b), the term of this patent shall be extended for 0 days.

(21) Appl. No.: 09/363,761

(22) Filed: Jul. 29, 1999

(51) Int. Cl.[7] .................................................. A47K 1/08
(52) U.S. Cl. .......................................... 248/311.2; 224/926
(58) Field of Search .............................. 248/311.2, 313, 248/314; 224/926

(56) References Cited

U.S. PATENT DOCUMENTS

| | | | |
|---|---|---|---|
| 5,297,767 | * 3/1994 | Miller et al. | 248/311.2 |
| 5,839,711 | * 11/1998 | Bieck et al. | 248/311.2 X |
| 5,897,090 | * 4/1999 | Smith et al. | 248/311.2 |
| 6,050,468 | * 4/2000 | Kelley | 248/311.2 X |

* cited by examiner

Primary Examiner—Ramon O. Ramirez
(74) Attorney, Agent, or Firm—Mark A. Ussai

(57) ABSTRACT

An expandable cup holder for a golf cart includes a support member forming a substantially planar top surface for the cup holder. The support member is fastened to a vehicle with the support member top surface oriented substantially horizontal. The top surface forms a top aperture large enough to receive a plurality of cup sizes. A plurality of flexible fingers are spaced apart from each other around the perimeter of the aperture. The fingers extend conically downwardly toward each other below the top surface, to form a slotted, frustum-shaped member that flexibly contacts and frictionally retains a plurality of cup sizes therein. Front and side walls on the support member surround and support the frustum-shaped member. The front wall includes apertures for retaining golf tees.

11 Claims, 2 Drawing Sheets

EXPANDABLE CUP HOLDER FOR A VEHICLE

BACKGROUND OF THE INVENTION

This invention relates generally to cup holders for various size drink containers, and more particularly to such cup holders mounted on golf carts.

With the advent of various sports-oriented drinks, the containers therefor have gotten larger, with the result that cup holders, especially those on golf carts, must have a greater range of expansion to hold the wide variety of sizes securely during movement of the vehicle.

Accordingly, a suitable alternative is provided including features more fully disclosed hereinafter.

SUMMARY OF THE INVENTION

In one aspect of the present invention, this is accomplished by providing an expandable cup holder for a vehicle comprising: a support member forming a substantially planar top surface for the cup holder; means for fastening the cup holder to a vehicle with the support member top surface oriented substantially horizontal; the top surface forming a top aperture large enough to receive a plurality of cup sizes, the aperture having a perimeter; and a plurality of flexible fingers spaced apart from each other around the perimeter, the fingers extending conically downwardly toward each other below the top surface, to form a slotted, frustum-shaped member that flexibly contacts and frictionally retains a plurality of cup sizes therein.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
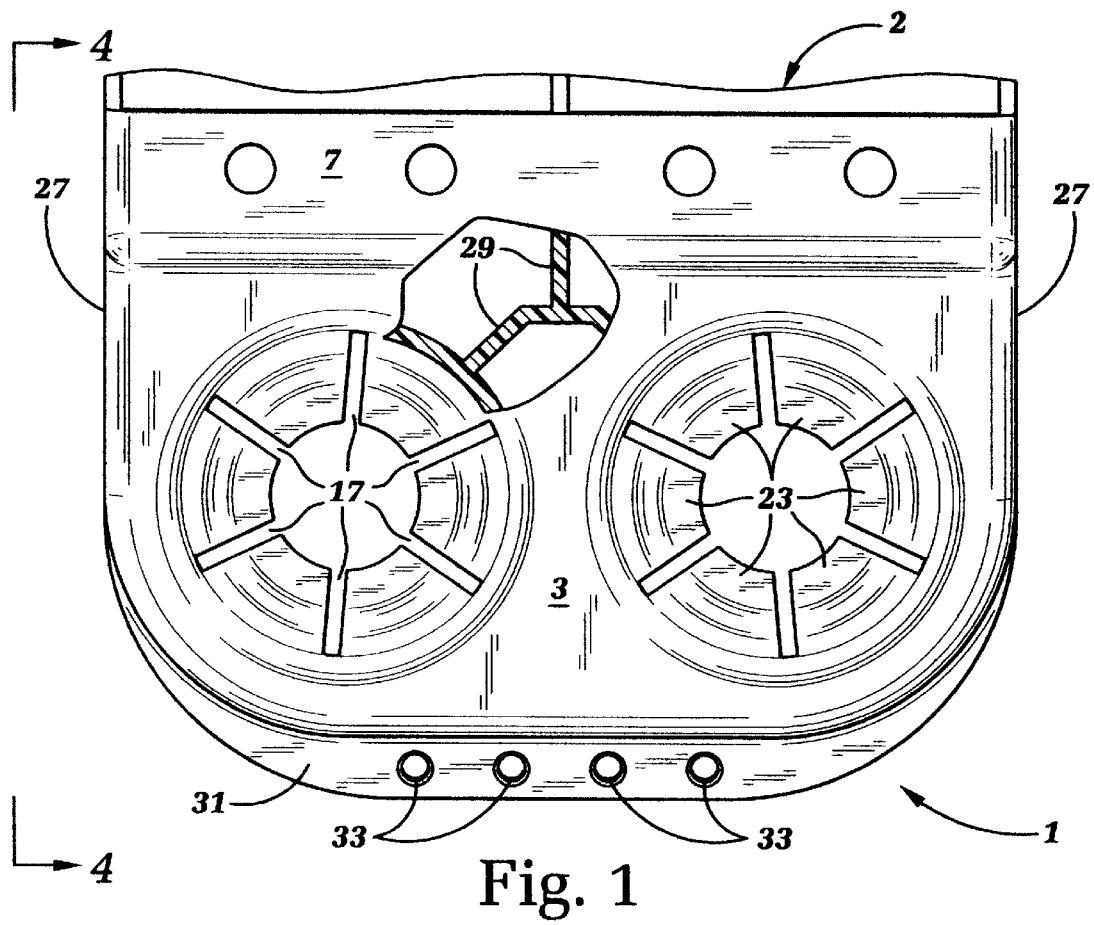
FIG. 1 is a schematic top plan view, in partial cross section, of the cup holder of the invention.
Figure 2:
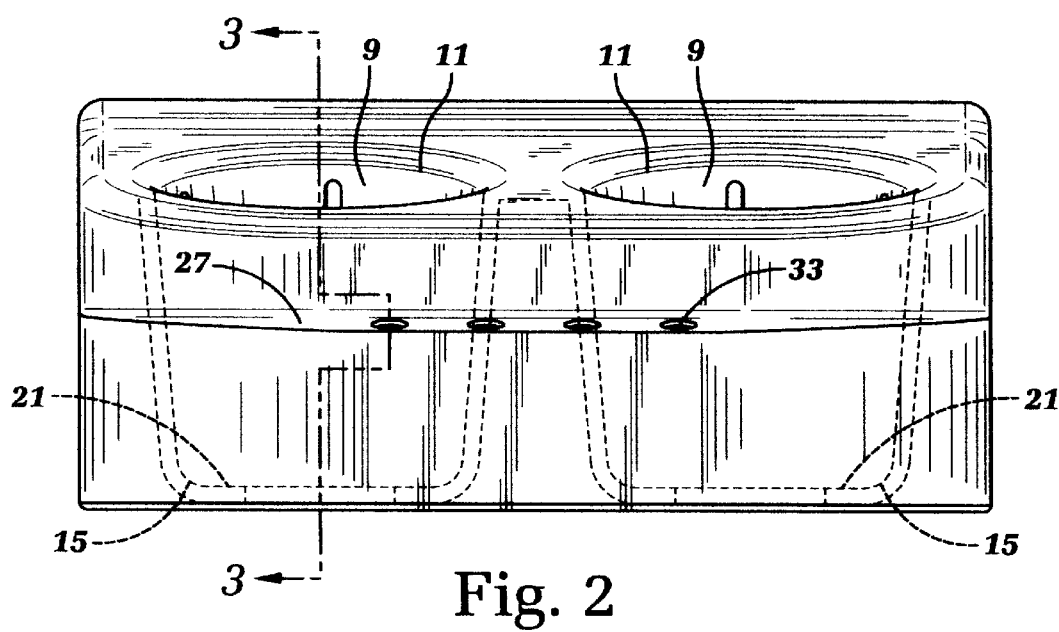
FIG. 2 is a front elevational view of FIG. 1, in partial cross section and with parts removed for clarity.
Figure 3:
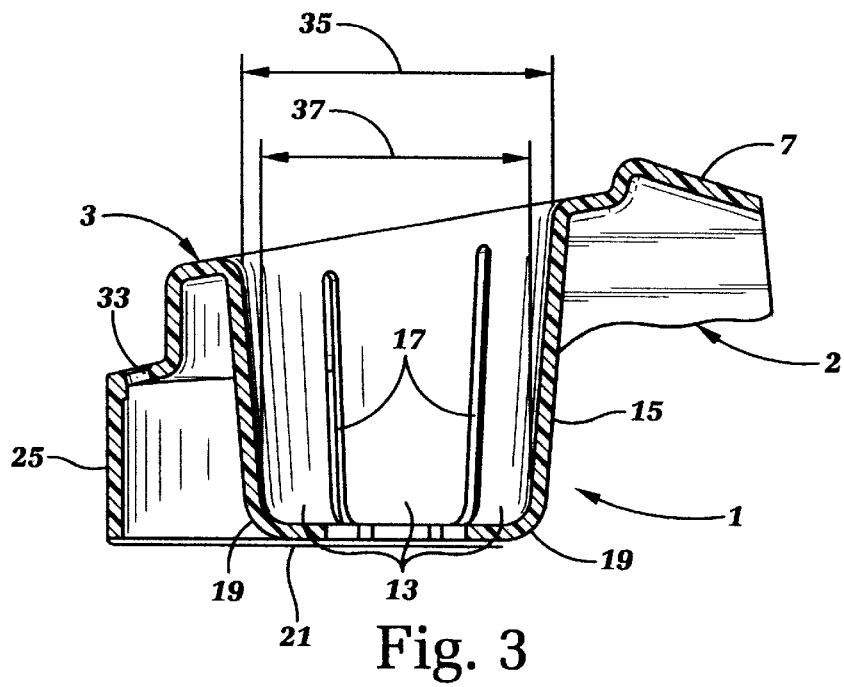
FIG. 3 is a view along A—A of FIG. 2.
Figure 4:
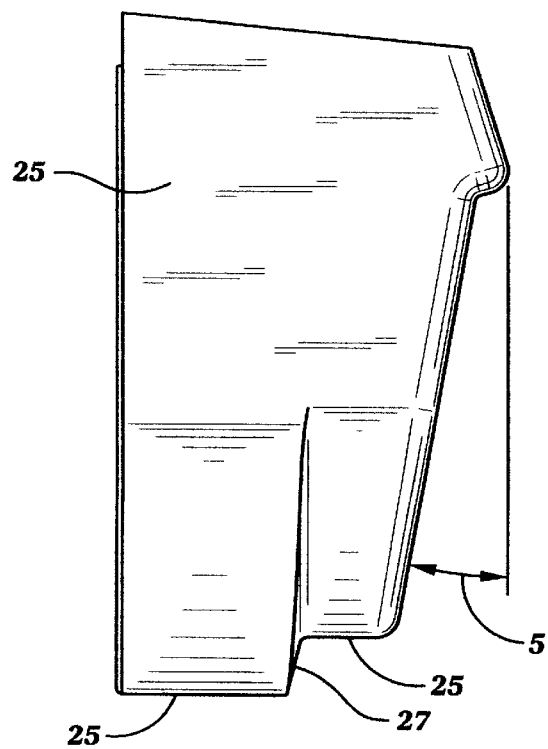
FIG. 4 is a side elevational view along B—B of FIG. 1.

Referring to FIGS. 1–4, cup holder 1, includes a substantially planar top surface 3. Cup holder I is fastened to a vehicle (golf cart 2 shown in phantom), as described hereinafter, with top surface 3 facing upwardly and oriented substantially horizontal. "Substantially horizontal" includes an angle to horizontal of about 10°, as shown at 5 in FIG. 4, Cup holder 1 is fastened to vehicle 2 by conventional means (nuts and bolts not shown) via rear flange 7 that extends from top surface 3 and is connected to vehicle 2.

Top surface 3 forms at least one, and preferably two, apertures 9 large enough to receive a plurality of cup sizes. Each aperture 9 has a perimeter 11. A description of one aperture 9 and cup holder 1 associated therewith will suffice for other such apertures and cup holders.

A plurality of flexible, elastomeric, fingers 13 spaced apart from each other is positioned around the perimeter 11. I prefer six such fingers 13, but other numbers of fingers will work. Fingers 13 extend conically downwardly toward each other below top surface 3 to form a frustum-shaped member 15 with slots 17 therein. Member 15 flexibly contacts and frictionally retains a plurality of cup sizes therein. I prefer to make apertures 9 circular in perimeter, but other polygonal shapes will work.

At the distal end 19 of each finger 13, a support base 21 for supporting a cup (not shown) is formed by flanges 23 extending inwardly toward each other. Base 21 supports a cup that is not fully supported by fingers 13.

I prefer to provide support member 3 with a unitary extension to form front wall 25 and a pair of sidewalls 27 extending downwardly around frustum-shaped member 15, for additional support and to shield it from view.

As shown in FIG. 1, support plates 29 connect to members 15 and top surface 3 for added rigidity.

Since the preferable application is on a golf cart, I provide a forwardly extending ledge member 31, with apertures 33 therein, to receive and retain golf tees (not shown).

I prefer to make the cup holder 1 as a single, unitary piece from an injection molded polypropylene, with fingers 13 and walls 25, 27 about 0.12 inches in thickness. As shown at 35 in FIG. 3, I prefer to make the aperture 9 at top surface 3 about 3.03 inches in diameter, with the aperture diameter at distal end 17 about 2.62 inches (as shown at 37 in FIG. 3). These aperture dimensions may vary as the size of containers varies in the future, without departing from the scope of this invention. It will be understood that the cup holder 1 of this invention will receive and frictionally hold a variety of cup sizes securely during movement of the vehicle on which it is mounted.

Having described the invention, what is claimed is:

1. An expandable cup holder for a vehicle comprising:
   a. a support member forming a substantially planar top surface for said cup holder,
   b. means for fastening said cup holder to a vehicle with said support member top surface oriented substantially horizontal;
   c. said top surface forming a top aperture large enough to receive a plurality of cup sizes, said aperture having a perimeter; and
   d. a plurality of flexible fingers integrally formed with the support member and spaced apart from each other around said perimeter, said fingers extending conically downwardly toward each other below said top surface, to form a slotted, frustum-shaped member that flexibly contacts and frictionally retains a plurality of cup sizes therein.

2. The invention of claim 1 wherein said top aperture is substantially circular in perimeter.

3. The invention of claim 2 further comprising: means at a distal end of each of said fingers for forming a base for supporting a cup thereon.

4. The invention of claim 3 wherein each of said distal end of said fingers is flanged inwardly toward each other to form said base.

5. An expandable cup holder for a vehicle comprising:
   a. a substantially planar support member forming a top surface for said cup holder;
   b. means for fastening said cup holder to a vehicle with said support member top surface oriented substantially horizontal;
   c. said top surface forming a plurality of top apertures, each said aperture large enough to receive a plurality of cup sizes, each said aperture having a perimeter; and
   d. a plurality of flexible fingers integrally formed with the support member and spaced apart from each other around each said perimeter, said fingers extending conically downwardly toward each other below said top surface, to form a slotted, frustum-shaped member that flexibly contacts and frictionally retains a plurality of cup sizes therein.

6. The invention of claim 5 wherein said means for fastening said cup holder to said vehicle comprises:

a. a rear flange member extending from said top surface of said support member; and b. means for fastening said rear flange member to said vehicle.

7. The invention of claim 6 further comprising: said support member forming a unitary front wall and a pair of side walls extending downwardly from said top surface, around said frustum-shaped member, to support it and to shield it from view.

8. The invention of claim 7 wherein said vehicle is a golf cart and said front wall includes a frontwardly extending ledge member having a plurality of apertures therein for receiving and retaining golf ball tees.

9. An expandable cup holder for a vehicle comprising:

a. a substantially planar support member forming a top surface for said cup holder;

b. means for fastening said cup holder to a vehicle with said support member top surface oriented substantially horizontal, said means for fastening including a rear flange member extending from said top surface of said support member and means for fastening said rear flange member to said vehicle;

c. said top surface forming a plurality of top apertures, each said aperture large enough to receive a plurality of cup sizes, each said aperture having a perimeter; and d. a plurality of flexible fingers spaced apart from each other around each said perimeter, said fingers extending conically downwardly toward each other below said top surface, to form a slotted, frustum-shaped member that flexibly contacts and frictionally retains a plurality of cup sizes therein.

10. The invention of claim 9 further comprising: said support member forming a unitary front wall and a pair of side walls extending downwardly from said top surface, around said frustum-shaped member, to support it and to shield it from view.

11. The invention of claim 10 wherein said vehicle is a golf cart and said front wall includes a frontwardly extending ledge member having a plurality of apertures therein for receiving and retaining golf ball tees.

* * * * *